US007454955B2

(12) United States Patent
DeVries et al.

(10) Patent No.: US 7,454,955 B2
(45) Date of Patent: Nov. 25, 2008

(54) LEAK DETECTION STRUCTURE

(75) Inventors: Mark A. DeVries, Albany, OR (US); Rhonda L. Wilson, E Monmouth, OR (US); Craig Malik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 10/976,573

(22) Filed: Oct. 29, 2004

(65) Prior Publication Data

US 2006/0092240 A1 May 4, 2006

(51) Int. Cl.
*G01M 3/04* (2006.01)

(52) U.S. Cl. .......................................................... 73/40

(58) Field of Classification Search .................. 73/49.2, 73/49.3, 40; 340/602
See application file for complete search history.

(56) References Cited

U.S. PATENT DOCUMENTS

| | | | | | |
|---|---|---|---|---|---|
| 3,981,181 | A | * | 9/1976 | Ochiai | 73/40.5 R |
| 4,206,632 | A | * | 6/1980 | Suzuki | 73/40.5 R |
| 4,805,662 | A | * | 2/1989 | Moody | 137/312 |
| 4,843,305 | A | * | 6/1989 | Akiba | 340/605 |
| 4,864,847 | A | * | 9/1989 | Anderson et al. | 73/40.7 |
| 4,922,232 | A | * | 5/1990 | Bosich | 340/605 |
| 5,355,720 | A | * | 10/1994 | Bailey | 73/40 |
| 5,918,267 | A | * | 6/1999 | Evans et al. | 73/40.5 R |
| 6,229,229 | B1 | * | 5/2001 | Sharp | 307/118 |
| 6,402,277 | B1 | * | 6/2002 | Monclus et al. | 347/7 |
| 6,431,678 | B2 | * | 8/2002 | Beck et al. | 347/19 |
| 6,731,215 | B2 | * | 5/2004 | Harms et al. | 340/605 |
| 6,752,785 | B2 | * | 6/2004 | Van Antwerp et al. | 604/111 |
| 6,826,948 | B1 | * | 12/2004 | Bhatti et al. | 73/40.5 R |
| 6,865,941 | B2 | * | 3/2005 | Gibbs | 73/40.5 R |
| 6,877,359 | B2 | * | 4/2005 | Huang et al. | 73/40 |
| 6,978,659 | B2 | * | 12/2005 | Phillips et al. | 73/40 |
| 2003/0011482 | A1 | * | 1/2003 | Harms et al. | 340/605 |

FOREIGN PATENT DOCUMENTS

| | | |
|---|---|---|
| EP | 0 768 183 | 4/1997 |
| EP | 0 882 594 | 12/1998 |

* cited by examiner

*Primary Examiner*—Hezron Williams
*Assistant Examiner*—John Fitzgerald

(57) ABSTRACT

One embodiment of a leak detection structure includes a sensor having a leak detection surface and a wicking structure positioned adjacent the leak detection surface, the wicking structure adapted for wicking a fluid onto the leak detection surface.

9 Claims, 2 Drawing Sheets

Fig. 3
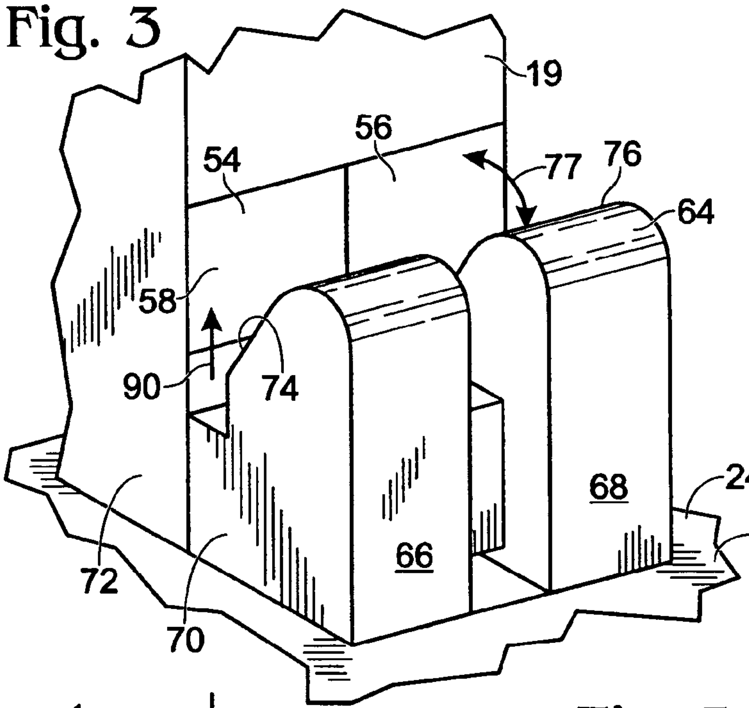
Fig. 4
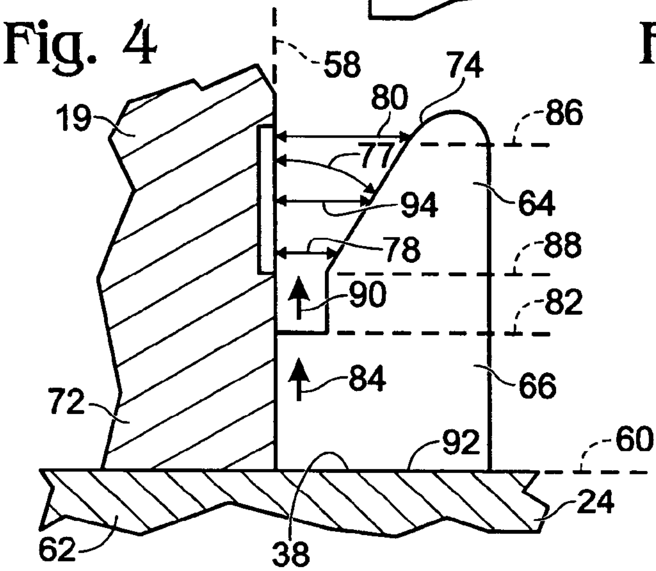
Fig. 5
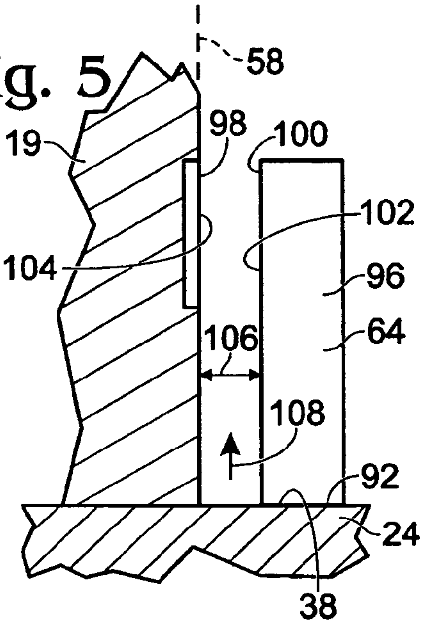
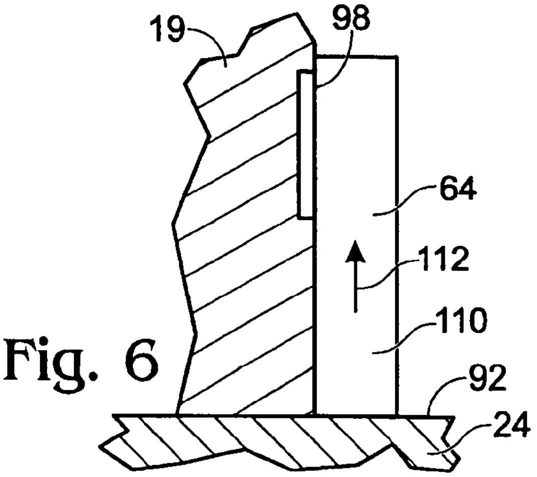
Fig. 6

LEAK DETECTION STRUCTURE

BACKGROUND

Printing mechanisms may include a printhead for printing an image on a media. One or more inks are usually supplied to the printhead from one or more ink reservoirs. Unfortunately, if ink leaks from an ink reservoir it may harm components within the printing mechanism. Certain printing mechanisms therefore include a sensor that is positioned within the printing mechanism to detect an ink leak and in response alert the user in some manner.

BRIEF DESCRIPTION OF THE DRAWINGS

FIG. 3 is a detailed perspective view of the exemplary leak detection structure shown in FIG. 2.

FIG. 4 is a partial cross-sectional side view of the exemplary leak detection structure shown in FIG. 2.

FIG. 5 is a partial cross-sectional side view of another exemplary leak detection structure in accordance with another embodiment of the present invention.

FIG. 6 is a partial cross-sectional side view of another exemplary leak detection structure in accordance with yet another embodiment of the present invention.

DETAILED DESCRIPTION OF THE DRAWINGS

Figure 1:
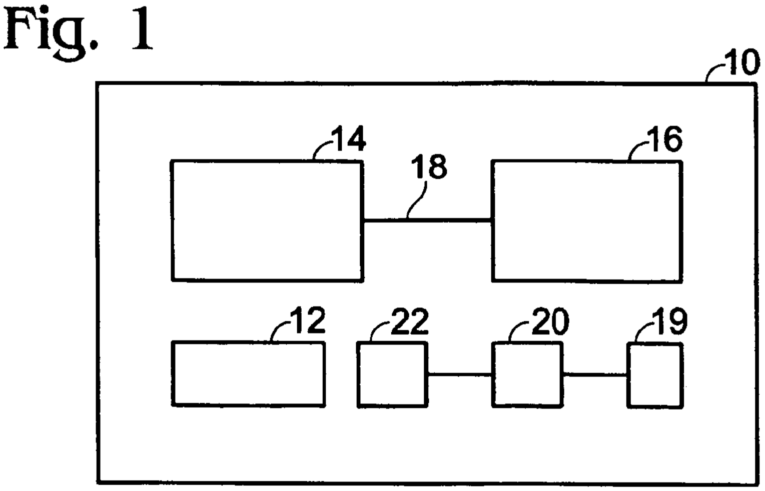
FIG. 1 is a schematic view of one embodiment of a printing mechanism that includes an exemplary leak detection structure in accordance with an embodiment of the present invention.

FIG. 1 is a schematic view of one embodiment of a printing mechanism 10 for printing an image on one embodiment of a media 12. Printing mechanism 10 may be a printer, a copier, a facsimile machine, a camera or the like, any combination thereof, or any device suitable for imaging. Media 12 may include paper, fabric, mylar, transparency foils, cardboard, or any other medium suitable for imaging thereon. Printing mechanism 10 includes a print cartridge 14 for printing an image on media 12. Print cartridge 14 is operatively connected to an ink supply 16, such as, for example, by a connection tube 18 or the like. In this manner, ink contained within ink supply 16 can then be delivered to print cartridge 14. A sensor 19 is positioned within printing mechanism 10 so as to detect a leakage of ink from ink supply 16. Sensor 19 may be operatively connected to a controller 20 wherein controller 20 may activate a notification device 22, such as a visual or an audible alert device, which may alert a user that an ink leak has occurred. Controller 20 may also function to shut down operation of printing mechanism 10 if a leak is detected.

Figure 2:
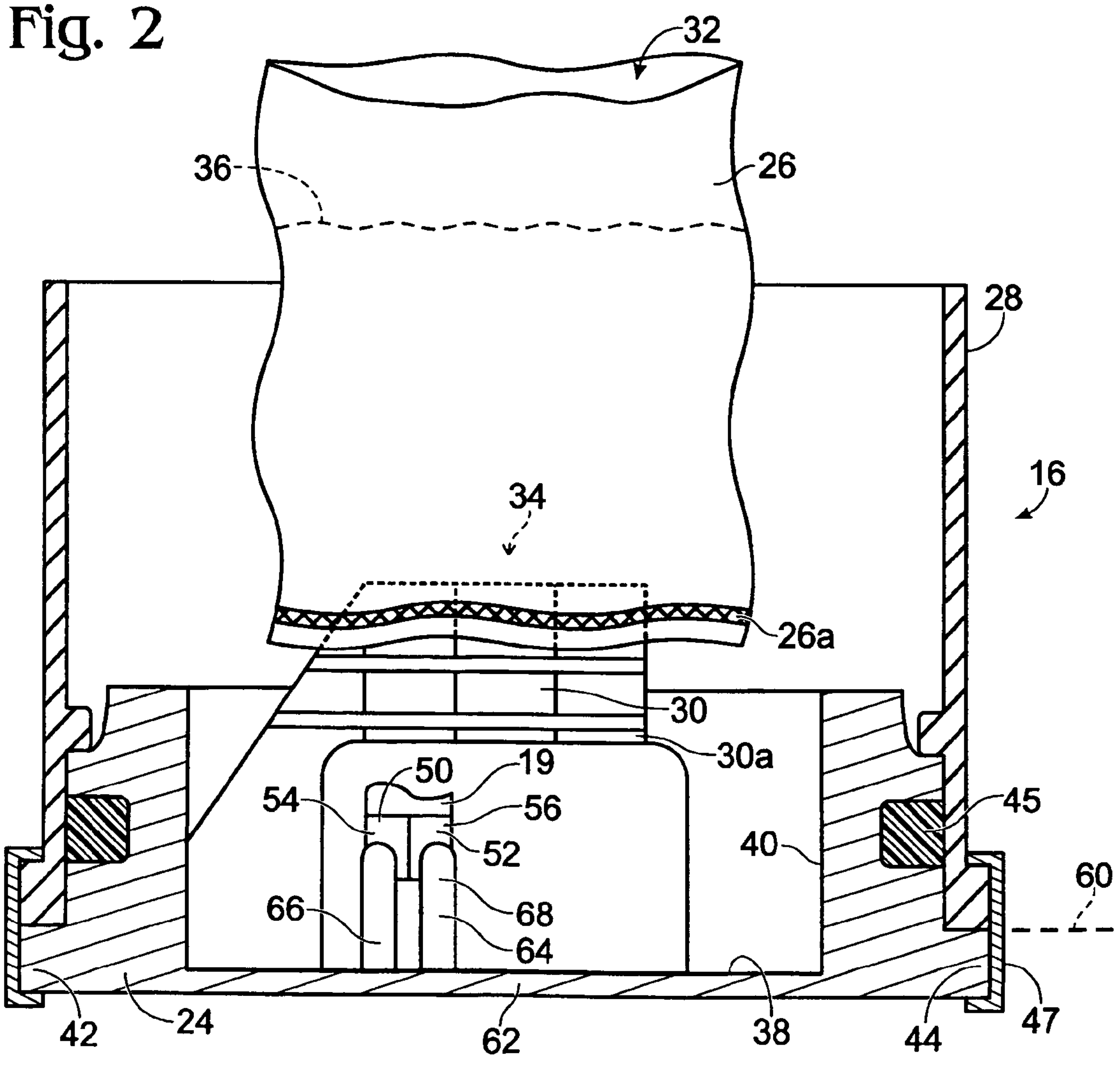
FIG. 2 is a partial cross-sectional side view of an exemplary embodiment of an ink supply including an exemplary leak detection structure in accordance with an embodiment of the present invention.

FIG. 2 is a partial cross-sectional side view of one embodiment of ink supply 16. In this example, ink supply 16 includes a chassis 24 that is connected to a first ink container 26, such as a flexible ink container or a bag (shown in a small size for ease of illustration), and a second ink container 28, such as a rigid container or a bottle. Bag 26 is secured on an upwardly extending projection 30 of chassis 24, which includes a support fin 30*a*, wherein an interior 32 of bag 26 and an interior 34 of projection 30 are in fluidic communication with connection tube 18 (see FIG. 1), and therefore, in connection with print cartridge 14 (see FIG. 1). In this manner, ink 36 contained within bag 26 is delivered to print cartridge 14. In the embodiment shown, bag 26 is "heat staked," e.g., welded or heat sealed, to projection 30 and fin 30*a* along a heat sealing region 26*a* of bag 26.

As further illustrated in the example in FIG. 2, ink supply 16 includes an ink reservoir 38 that is defined by an upwardly extending wall 40 that extends around a perimeter 42 of chassis 24. Ink reservoir 38 is structured to retain at least a portion of ink that leaks from bag 26. Here, leaking ink will likely flow downwardly into ink reservoir 38 by the force of gravity. The leaking ink may also flow downwardly as a result of air pressure or the like. Wall 40 includes a securement structure, such as an outwardly extending ridge 44, that is utilized to retain bottle 28 thereon. In the exemplary embodiment shown, bottle 28 is secured to chassis 24, with an intervening o-ring 45, by a clamp ring 47 positioned therearound.

Bag 26 is secured on chassis 24 and inside bottle 28. Bottle 28 with bag 26 therein, therefore, functions as a double wall ink supply container which may function to reduce ink leakage to the outside of bottle 28. Accordingly, such a double wall ink supply container may limit ink damage to components of printing mechanism 10 that may be positioned outside of bottle 28. Damage to components of printing mechanism 10 (see FIG. 1) may also be reduced by positioning a sensor within bottle 28 so as to detect an ink leaked from bag 26, before the ink leaks from bottle 28.

Ink supply 16 further includes sensor 19 which, in this example, is secured on chassis 24 outside of bag 26 and inside of bottle 28. Sensor 19 is configured to detect the presence of ink. As such, sensor 19 and/or operative components of sensor 19 are positioned within ink reservoir 38 such that if ink leaks from bag 26 and flows downwardly into ink reservoir 38 it is detected. When sensor 19 detects the presence of leaked ink it notifies or otherwise signals controller 20 or other like circuitry (see FIG. 1). In FIG. 2, sensor 19 includes as operative components first and second contact pads 50 and 52, respectively, that are positioned nearby or adjacent one another. In this embodiment, pads 50 and 52 each define a detection surface 54 and 56, respectively. In the embodiment shown, detection surfaces 54 and 56 are gold contact pads. Detection surfaces 54 and 56 may be positioned in a plane 58 (e.g., as shown in end view in FIG. 4) that is perpendicular to a plane 60 of a base 62 of chassis 24. In the exemplary embodiment sensor 19 is a flexible circuit including a plurality of traces that are in electrical contact with detection surfaces 54 and 56 such that an electrical conductivity between surfaces 54 and 56 may be signaled to controller 20.

Sensor 19 is configured to measure or otherwise detect changes in one or more electrical parameters using detection surfaces 54 and 56. The electrical parameters will change in some manner when leaked ink contacts detection surfaces 54 and/or 56. The measured/detected electrical parameters may include resistance, impedance, capacitance, etc.

For example, in a nominal, non-leak state, detection surfaces 54 and 56 would be in contact with air. Accordingly, sensor 19 will detect an electrical parameter associated with the air. For example, sensor 19 may measure the resistance between detection surfaces 54 and 56 through the air. If the measured resistance is above a predetermined threshold level, such as a resistance level of about 8 mega ohms, then a "no leak" condition may be reported to controller 20 (see FIG. 1). In a leak state, for example, both of detection surfaces 54 and 56 may be in contact with leaked ink which may provide a conductivity path between surfaces 54 and 56. The ink may have a lower electrical resistance value than air, which may be at or below a predetermined threshold level, such as at a resistance level of about 6 mega ohms or lower, such that a "leak" condition may be detected by controller 20. The predetermined threshold measurement level may be set at any value desired and in some embodiments, may be varied during use.

Still referring to FIG. 2, ink supply 16 may further include a leak detection structure 64 that may be positioned adjacent to or in contact with sensor 19. Leak detection structure 64 is configured to function to move ink leaked into ink reservoir 38 upwardly onto, and to retain the ink on, detection surfaces 54 and 56 of sensor 19. In the embodiment shown in FIG. 2, leak detection structure 64 includes a first rib 66 positioned adjacent first detection surface 54 and a second rib 68 positioned adjacent second detection surface 56. Ribs 66 and 68 may be spaced from detection surfaces 54 and 56, respectively, a predetermined distance, as will be described in more detail below. Ribs 66 and 68, therefore, may define a wicking and/or a capillary structure such that ink retained in ink reservoir 38 may be moved by wicking and/or capillary action upwardly between ribs 66 and 68 and detection surfaces 54 and 56, respectively, and into contact with detection surfaces 54 and 56.

FIGS. 3 and 4 are a detailed perspective view and a partial cross-sectional side view, respectively, of leak detection structure 64 shown in FIG. 2. In this embodiment, ribs 66 and 68 extend upwardly from a base 70 of leak detection structure 64, wherein base 70 is positioned against a lower region 72 of sensor 19. Each of ribs 66 and 68 may include a wicking surface 74 and 76, respectively, positioned adjacent to and spaced from each of detection surfaces 54 and 56, respectively. In the embodiment shown, wicking surfaces 74 and 76 may be inclined with respect to plane 58 so as to define an angle 77 therebetween. Angle 77 may be any angle suited for a particular sensor or detection surface. In the exemplary embodiment shown, angle 77 is about 15 degrees. In other embodiments, angle 77 may be a low as zero degrees, i.e., parallel to the detection surfaces, about five degrees from the detection surfaces, and as high or higher than about thirty degrees. In another embodiment, one or both of wicking surface 74 and 76 are inclined with respect to plane 58 such that an upper region of the wicking surfaces may be closer to plane 58 than a lower region of wicking surface 74 and 76. In still another embodiment, plane 58 of detection surfaces 54 and 56 are inclined with respect to a vertical plane.

Wicking surfaces 74 and 76 may be spaced from detection surfaces 54 and 56, respectively, a distance 78 in a lower region of surfaces 74 and 76, and may be spaced from detection surfaces 54 and 56, respectively, a distance 80 in an upper region of surfaces 74 and 76. Distances 78 and 80 may be any distance or spacing sufficient to facilitate movement of ink 36 (see FIG. 2) upwardly between wicking surfaces 74 and 76 and detection surfaces 54 and 56, respectively, by capillary or surface tension forces. Accordingly, distances 78 and 80 may vary from one printing mechanism to another based on the surface tension properties of ink 36 (see FIG. 2) contained within ink supply 16 (see FIG. 1), and which may leak into ink reservoir 38 of chassis 24 (see FIG. 2). In the exemplary embodiment shown, wherein ink 36 (see FIG. 2) includes inkjet ink suited for printing on a sheet of paper, distances 78 and 80 may be in a range of zero to about 20 millimeters. In certain embodiments, distances 78 and 80 are less than about 5 millimeters.

Due to the wicking properties of leak detection structure 64, once ink rises to a level 82 within ink reservoir 38, the ink may be moved by capillary and/or wicking action upwardly in direction 84 between wicking surfaces 74 and 76 and detection surfaces 54 and 56, respectively, to a height 86, for example, such that a conductivity path is created between detection surfaces 54 and 56 through the ink, thereby allowing sensor 19 to detect the presence of leaked ink. In other embodiments, level 82 may be contiguous with a floor 92 of ink reservoir 38, or may be positioned at any level as desired.

The space between wicking surfaces 74 and 76 and detection surfaces 54 and 56, respectively, may be referred to as a wicking and/or capillary path 90. Here, path 90 has a width 94 that may be sufficient to allow ink 36 (see FIG. 2) to move upwardly along path 90 and simultaneously onto detection surfaces 54 and 56 by capillary action and/or surface tension forces. Moreover, width 94 may be sufficient to retain ink 36 (see FIG. 2) within path 90 due to capillary and/or surface tension forces. In the embodiment shown in FIGS. 3 and 4, width 94 of path 90 varies from distance 78 in a lower region of detection surfaces 54 and 56 to distance 80 in an upper region of detection surface 54 and 56. Due to leak detection structure 64 positioned adjacent to or in contact with detection surfaces 54 and 56, an ink leak is detected prior to ink reservoir 38 filling completely to a level as high as detection surfaces 54 and 56, such as a level 88. The difference in a volume of ink at level 82 and a volume of ink at level 88 within ink reservoir 38 can be quite large, such that incorporation of ink detection structure 64 in printing mechanism 10 (see FIG. 1) may significantly reduce the amount of ink present in ink reservoir 38 before a leak may be detected. Thus, incorporation of ink detection structure 64 in printing mechanism 10 (see FIG. 1) tends to significantly reduce the amount of time that may pass from an initial leak before a leak may be detected.

By way of example, in one test case, wherein ink detection structure 64 was not incorporated in printing mechanism 10, ink was detected by sensor 19 when 2.6 cubic centimeters (cc) of ink was leaked from bag 26. After incorporation of leak detection structure 64 into printing mechanism 10 adjacent sensor 19, ink was detected by sensor 19 when 0.6 cc of ink was leaked from bag 26. Accordingly, leak detection structure 64 may allow detection of a leak upon leakage of a significantly smaller amount of ink than devices that do not include ink detection structure 64. Detection of a leak at an earlier time, i.e., after leakage of a lesser amount of ink, may result in preventative measures being taken at an earlier time, thereby potentially reducing damage to printing mechanism 10.

FIG. 5 is a side view of another embodiment of a leak detection structure 64. In this embodiment, leak detection structure 64 includes a solid wall 96 and sensor 19 includes a pair of detection surfaces 98. In this embodiment, wall 96 may define a wicking surface 100 that may define a plane 102 (seen in side view) that may be parallel to a plane 104 (seen in side view) of pair of detection surfaces 98. Wall 96 may be spaced from sensor 19 and from pair of detection surfaces 98 by a spacing 106, wherein spacing 106 may extend downwardly to floor 92 of chassis 24 and ink reservoir 38. Accordingly, an ink wicking pathway 108 extends upwardly directly from floor 92 of chassis 24. Ink leaked into ink reservoir 38 (see FIG. 2), therefore, may quickly come into contact with pathway 108 such that even a very small amount of leaked ink may generate a volume of ink sufficient to be wicked along pathway 108 to as to allow detection of the ink leak by sensor 19 and controller 20 (see FIG. 1).

FIG. 6 is a side view of another embodiment of a leak detection structure 64. In this embodiment, leak detection structure 64 includes a wicking material, such as an absorbent material 110 that extends upwardly from floor 92 of chassis 24 and is positioned adjacent to and in contact with pair of detection surfaces 98 of sensor 19. In this embodiment, a wicking and/or capillary pathway 112 of ink 36 (see FIG. 2) may extend through absorbent material 110 itself. Absorbent material 110 may, for example, include an open cell foam or any other type of material that may facilitate ink being drawn into and upwardly within the material so as to come into contact with detection surfaces 98 of sensor 19. Absorbent material 110 may include a foam, a woven fiber, a plastic fiber, or the like. In this embodiment, ink is draw upwardly and into contact with pair of detection surfaces 98 so as to define a conductivity pathway therebetween that may be sensed by controller 20 (FIG. 1). In an absence of ink within absorbent material 110, sensor 20 detects a conductivity of air between pair of detection surfaces 98.

Similar to the ink wicking pathway 90 of FIG. 4 and pathway 108 of FIG. 5, absorbent material 110 provides wicking pathway 112 through which ink moves by a wicking action. Accordingly, in the exemplary embodiments shown, ink moves upwardly through an air space, such as pathway 90 (FIG. 4), 108 (FIG. 5) or 112 (FIG. 6) and into contact with a detection surface, wherein the pathway is defined by an upwardly extending structure positioned near or adjacent to the detection surfaces.

Other variations and modifications of the concepts described herein may be utilized and fall within the scope of the claims below.

We claim:

1. A leak detection structure, comprising:

a sensor including a planar leak detection surface; and a wicking structure positioned adjacent said planar leak detection surface, said wicking structure adapted for wicking a fluid into contact with said planar leak detection surface.

2. A leak detection structure, comprising:

a sensor including a leak detection surface; and a wicking structure positioned adjacent said leak detection surface, said wicking structure adapted for wicking a fluid into contact with said leak detection surface, wherein said wicking structure includes a wicking surface spaced from said leak detection surface so as to define therebetween a wicking path for said fluid.

3. A leak detection structure according to claim 1 wherein said wicking structure comprises an absorbent material positioned in contact with said planar leak detection surface, said absorbent material adapted for absorbing said fluid therein.

4. A leak detection structure, comprising:

a sensor including a leak detection surface; and a wicking structure positioned adjacent said leak detection surface, said wicking structure adapted for wicking a fluid into contact with said leak detection surface, wherein said wicking structure includes a wicking surface spaced from said leak detection surface so as to define therebetween a wicking path for said fluid, wherein said wicking structure comprises a rib that includes said wicking surface, and wherein said wicking surface defines a plane positioned with respect to a plane of said leak detection surface at an angle in a range of zero to thirty degrees.

5. A leak detection structure, comprising:

a sensor including a leak detection surface; and a wicking structure positioned adjacent said leak detection surface, said wicking structure adapted for wicking a fluid into contact with said leak detection surface, wherein said wicking structure includes a wicking surface spaced from said leak detection surface so as to define therebetween a wicking path for said fluid, wherein said wicking path defines a width sufficient to retain said fluid within said path due to surface tension forces.

6. A leak detection structure, comprising:

a sensor including a leak detection surface; and a wicking structure positioned adjacent said leak detection surface, said wicking structure adapted for wicking a fluid into contact with said leak detection surface wherein said leak detection surface comprises first and second contact pads, and wherein said wicking structure is adapted for wicking a fluid simultaneously onto said first and second contact pads so as to define a conductivity path between said pads and through said fluid.

7. A leak detection structure, comprising:

a sensor including a leak detection surface; and a wicking structure positioned adjacent said leak detection surface, said wicking structure adapted for wicking a fluid into contact with said leak detection surface, wherein said leak detection surface comprises first and second contact pads, and wherein said wicking structure is adapted for wicking a fluid simultaneously onto said first and second contact pads so as to define an conductivity path between said pads and through said fluid, further comprising a controller, and wherein said sensor indicates to said controller that a leak is detected when a resistance of said conductivity path between said pads reaches a resistance of 8 mega ohms or less.

8. A leak detection structure, comprising:

a sensor including a leak detection surface; and a wicking structure positioned adjacent said leak detection surface, said wicking structure adapted for wicking a fluid into contact with said leak detection surface, wherein said wicking structure comprises an absorbent material positioned in contact with said leak detection surface, said absorbent material adapted for absorbing said fluid therein, wherein said absorbent material is chosen from the group consisting of foam, woven fiber, plastic fiber.

9. A leak detection structure, comprising:

a sensor including a leak detection surface; and a wicking structure positioned adjacent said leak detection surface, said wicking structure adapted for wicking a fluid along only a vertical path and into contact with said leak detection surface.

* * * * *